(12) United States Patent
Spross et al.

(10) Patent No.: US 7,207,215 B2
(45) Date of Patent: Apr. 24, 2007

(54) SYSTEM, METHOD AND APPARATUS FOR PETROPHYSICAL AND GEOPHYSICAL MEASUREMENTS AT THE DRILLING BIT

(75) Inventors: Ronald L. Spross, Humble, TX (US); Paul F. Rodney, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 35 days.

(21) Appl. No.: 10/745,381

(22) Filed: Dec. 22, 2003

(65) Prior Publication Data

US 2005/0132794 A1 Jun. 23, 2005

(51) Int. Cl.
*E21B 47/00* (2006.01)

(52) U.S. Cl. .................. 73/152.03; 73/152.43

(58) Field of Classification Search ............ 73/152.03, 73/152.43; 175/61
See application file for complete search history.

(56) References Cited

U.S. PATENT DOCUMENTS

| | | | | |
|---|---|---|---|---|
| 5,513,714 A | * | 5/1996 | Downie et al. ............... 175/76 |
| 5,519,668 A | * | 5/1996 | Montaron ..................... 367/35 |
| 5,602,541 A | * | 2/1997 | Comeau et al. ........... 340/853.3 |
| 5,720,355 A | | 2/1998 | Lamine et al. ................. 175/27 |
| 5,853,053 A | * | 12/1998 | Gilchrist et al. ............ 175/101 |
| 5,899,958 A | | 5/1999 | Dowell et al. .................. 702/6 |
| 6,057,784 A | * | 5/2000 | Schaaf et al. ............ 340/854.4 |
| 6,084,826 A | * | 7/2000 | Leggett, III .................... 367/82 |
| 6,150,822 A | * | 11/2000 | Hong et al. .................. 324/338 |
| 6,230,557 B1 | * | 5/2001 | Ciglenec et al. ......... 73/152.01 |
| 6,269,892 B1 | * | 8/2001 | Boulton et al. ................ 175/61 |
| 6,405,136 B1 | * | 6/2002 | Li et al. ........................ 702/10 |
| 6,510,105 B1 | * | 1/2003 | Kroode et al. ................. 367/68 |
| 6,564,883 B2 | * | 5/2003 | Fredericks et al. ............ 175/50 |
| 6,581,699 B1 | * | 6/2003 | Chen et al. .................... 175/61 |
| 6,693,554 B2 | * | 2/2004 | Beique et al. ........... 340/856.3 |
| 6,848,518 B2 | * | 2/2005 | Chen et al. .................... 175/61 |
| 2003/0010534 A1 | | 1/2003 | Chen et al. .................... 175/61 |

FOREIGN PATENT DOCUMENTS

GB 2157342 A * 10/1985

OTHER PUBLICATIONS

Blaine et al. "Implementation of a Next Generation Rotary Steerable System," AADE, 2001.*

(Continued)

*Primary Examiner*—Hezron Williams
*Assistant Examiner*—John Fitzgerald
(74) *Attorney, Agent, or Firm*—Baker Botts L.L.P.

(57) ABSTRACT

Measurement of petrophysical and geophysical data of formations in a wellbore using a long gauge bit having at least one sensor therewith. The at least one sensor may be installed in at least one flute of the long gauge bit and/or in the long gauge portion thereof. Data for creating images of the formations are obtained at or near the bottom of the borehole and proximate to the long gauge bit used for drilling the borehole. Orientation of the long gauge bit is also available on a real time basis. Magnetic and/or gravitational sensors may be used in determining bit orientation. The flutes of the long gauge bit and the long gauge portion thereof may have standard inserts to accommodate various types of different sensors and electronic packages therefor.

44 Claims, 6 Drawing Sheets

OTHER PUBLICATIONS

"Improving Borehole Quality and Drilling Efficiency," *Technology Drilling*, May/Jun. 2003, pp. 30-38.

C.D. Rayton, Baker Hughes Inteq.; P. Taylor, Conoco UK LTD.; J. Grindrod and C. Sim, Baker Hughes Inteq.; and N. Biggs, Hughes Christensen, "Directional Technology, Steerable systems Advance," *Drilling Contractor*, Jan./Feb. 2002, pp. 18-20.

Blaine C. Comeaux, Sperry-Sun Drilling Services, a Halliburton Company AADE Member, *American Association of Drilling Engineers*, "Implementation of A Next Generation Rotary Steerable System," Copyright 2001 AADE National Drilling Technical Conference, Prepared for Presentation at the AADE 1001 National Drilling Conference Held at the Omni in Houston, Texas, Mar. 27-29, 2001, pp. 1-7.

* cited by examiner

SYSTEM, METHOD AND APPARATUS FOR PETROPHYSICAL AND GEOPHYSICAL MEASUREMENTS AT THE DRILLING BIT

FIELD OF THE INVENTION

The present invention relates generally to a system and method, using a bottom hole assembly, for obtaining formation data and locations thereof in a wellbore for creating images thereof, and more particularly to obtaining the formation data and locations thereof with sensors located in a long gauge drill bit attached to the bottom hole assembly.

BACKGROUND OF THE INVENTION TECHNOLOGY

Logging while drilling (LWD) measurements, while initially conceived primarily as alternatives or replacements for similar wireline measurements, are increasingly used to provide information which can influence the drilling process. This has progressed from determining the optimum casing point near an overpressured zone, to using gamma ray or density measurements to place and maintain a borehole within a geologic zone. In the latter case a number of different tools can be used, two examples of which are so-called azimuthal natural gamma ray tools and azimuthal density tools. In each case the tools are sensitive to the differences in the formation around the surface of the borehole as the borehole nears or crosses a formation bed boundary. As the tools rotate in the borehole, the data from them reflect these formation variations, and can be very important in "geo-steering"—that is, in the process of drilling a highly deviated or horizontal well bore through a formation, because the seismic data which are initially used to target a formation are often of insufficient quality and resolution to accurately place the well bore to the satisfaction of the driller. Measurements taken of the formation by tools near the bit in the drilling string provide information which can inform the driller when the target bed has been entered or exited, thereby allowing modifications to the drilling program that will provide much more value and higher success than would be the case using only seismic data.

The two most common methods of drilling horizontal and highly deviated wells are those which use mud motors, e.g., positive displacement motor (PDM), Moineau motor, turbine-type motor and the like, and those employing so-called rotary steerables. In the case of mud motors, the bottom hole assembly consists of (working up from the bottom of the drill string) the drilling bit, a short section of drill pipe or drill collar called a "bent sub", a mud motor assembly, and a LWD assembly consisting of logging sensors and systems capable of recording data as well as transmitting data to the surface, and finally the remainder of the drill collars and drill pipe. In either case, the logging sensors located in the LWD section, are some tens of feet from the drilling bit because of the length of the mud motor or the rotary steerable. Typically these sensors provide information about the formation that is within a few inches or one or two feet of the sensors themselves. Thus, if the driller is interested in the location of a bed boundary, a length of hole must be drilled approximately equal to the distance between the bit and sensors before the sensors are near enough to the bed boundary to sense its presence and for that information to be transmitted to the driller. "Course corrections," if desired following receipt of this information, are accomplished only through gradually changing the borehole direction, and thus additional lengths of borehole, equal to two or three times the bit-to-sensor distance, of necessity must be drilled before proper placement of the borehole is achieved. In this manner significant sections of horizontal boreholes intended to be placed in productive zones may be rendered useless. It is of course of great interest to avoid these kinds of drilling errors if possible.

Accordingly, there are at least two approaches that are suggested to increase the efficiency of drilling horizontal boreholes. One is to provide deeper reading sensors in the LWD string. Although the sensors remain a long distance from the bit, the target bed or bed boundary is almost always approached from a shallow angle. If the bed is of large areal extent, the deeper reading sensors will be able to "anticipate" the approach of the target before the boundary is crossed by the bit, even though the sensors are significantly behind the bit. The other alternative is to move sensors closer to the drill bit itself, either by placing small units in the short sections of the drill collar between the mud motor or rotary steerable and the bit, or in the bit itself. A disadvantage of the former approach is the difficulty of doing this without designing the sensor directly into the mud motor assembly, which limits the compatibility of the mud motors with other drill string components. Alternatively, designing sensors in the bit presents a similar problem in that constraints are placed on the choice of bits if the sensors are placed there. However, recent developments in rotary steerable technology and more conventional drilling techniques make the latter alternative more attractive.

The bit itself does represent an ideal choice of locations for certain types of sensors: specifically, high resolution sensors which require formation contact and are capable of taking data samples of various parameters representative of the borehole wall and formation properties in the vicinity of the borehole wall, wherein a high resolution image of the formation surrounding the borehole may be produced from these data samples. Innovative drilling products recently introduced which use long gauge bits are ideal candidates for sensors in the bit, as will be indicated below. Example products are the SLICKBORE® system which uses a mud motor and differently designed bit assembly, as well as the rotary-steerable system, e.g., GEO-PILOT® SLICKBORE® and GEO-PILOT®, are registered trademarks of Halliburton Energy Services, Inc,. Beltline Road, Carrollton, Tex. 75006. In each case these drilling tools are designed to produce a much smoother hole than is normally the case.

During drilling with traditional mud motor systems, the drill string is not rotated when the direction of the hole is being changed, and it is rotated when "drilling ahead". However, because of the bent sub assembly, a "spiral" hole is produced when rotating the string. Even if the placement of the hole is correct, the spiral sections so produced cause problems with placement of casing, and thereby limit the length of producing hole that can be obtained. However, rotary steerable systems are designed to drill "smooth" holes rather than spirals, e.g., SLICKBORE® and GEO-PILOT®.

A necessary aspect of both the bent sub and rotary steerable systems is the use of long gauge bits, where the gauge part of the bit consists of several inches of flutes between the "pin" of the bit and the bit itself. It is possible to place an insert with sensors in this section. Indeed this has been done by Sperry-Sun.

An important wireline capability that is not currently available in LWD is the ability to create a high resolution image of the formation surrounding the borehole. In the case of wireline logging, images are created using data from small, shallow reading sensors which are either in contact with, or in very close proximity to, the borehole wall. These sensors are commonly high resolution ultrasonic transducers or electrode sensors, and their responses are sensitive to small portions of the borehole wall. Images are constructed by assembling the responses of a number of similar sensors distributed around the borehole, as in the case of tools using a number of small electrodes on a pad which is forced against the borehole wall while logging. Alternatively, the image may be created from a large number of individual measurements taken rapidly by a single sensor rotating in the borehole. In contrast with wireline logging, reliable wall contact is usually not available in LWD logging. Although sensors that require wall contact are available in the LWD logging—density tools are an example—wall contact is intermittent, and a great deal of effort is expended to compensate for this fact. Images are produced with such tools, but these are necessarily of low resolution because of the physics of the sensor and the lack of reliable contact with the borehole wall. However, lack of wall contact is much less of an issue for long gauge bits, where the purpose of the extend gauge is to maintain contact with the borehole wall in order to have axial alignment of the bit with the borehole. Sensors placed in these long gauge bits will have the advantage of an environment where the wall contact is constant, or where the standoff from the wall is minimal. Thus, the long (extended) gauge bit represents "prime real estate" for the purpose of obtaining data samples sufficient to create high resolution images.

SUMMARY OF THE INVENTION

The invention overcomes the above-identified problems as well as other shortcomings and deficiencies of existing technologies by providing long gauge bits adapted to accommodate standard sensors and electronic inserts, and may have orifices in the flutes of the long gauge portion of the bit. The flutes may be in contact or near contact with the borehole wall and may be adapted to accommodate sensors used to gather information about the formation surrounding the borehole. Preferably the long gauge portion of the bit may be sufficiently standardized to accommodate inserts for placement of desired sensors. Sensors may be for example, but not limited to, highly focused ultrasonic sensors for obtaining acoustic reflective images of the borehole wall, electrodes for measuring small variations in the resistivity of the formation around the borehole, small high frequency antennas sensitive to the local electromagnetic response of the formation or to fields generated as a result of the drilling process, short range highly focused gamma or x-ray scattering sensors, rapid chemical sensors, and Micro-Electro-Mechanical Systems (MEMS). MEMS is the integration of mechanical elements, sensors, actuators, and electronics on a common silicon substrate through microfabrication technology. While the electronics are fabricated using integrated circuit (IC) process sequences (e.g., CMOS, Bipolar, or BICMOS processes), the micromechanical components are fabricated using compatible "micromachining" processes that selectively etch away parts of the silicon wafer or add new structural layers to form the mechanical and electromechanical devices. The present invention may be advantageously used with smooth hole drilling systems having precision geo-steering capability such as the aforementioned SLICKBORE® and GEO-PILOT® drilling systems. See, U.S. Pat. No. 6,269,892 B1, entitled Steerable Drilling System and Method, by Boulton, et al., and U.S. Patent Application Publication No. 2003/0010534 A1, entitled Steerable Drilling System and Method, by Chen, et al., both hereby incorporated by reference herein for all purposes.

According to an exemplary embodiment of the present invention, high resolution measurements may be performed with identical sensors, spaced apart axially and/or azimuthally by some distance (e.g., six inches), cross correlation calculations may be used to determine a time interval required for the tool to move the distance between the sensors, thereby determining the downhole drilling rate. See generally, U.S. Pat. No. 5,899,958, entitled Logging While Drilling Borehole Imaging and Dipmeter Device, by Dowell et al., hereby incorporated by reference herein for all purposes.

These sensors may be chosen for their ability to survive in the environment as well as obtain data from which a useful image could be constructed. It is also contemplated and within the scope of the present invention that multiple sensors may be placed in a single bit and thereby construction of different, complementary images would be possible. For example, electromagnetic and acoustic sensors probe different aspects of the formation, and therefore different properties would be expressed in the image, often providing additional complementary information.

This invention enables designing instrumented bits that may easily incorporate features of the latest drilling technologies. Both the SLICKBORE® and GEO-PILOTS drilling systems require the use of long gauge bits as an essential part of their technologies. As indicated above, these long gauge bits provide space in which electronic inserts can be installed. These inserts either act alone or in concert with sensors or transducers installed in the outer portions of the bit or its gauge section to provide the signals used in determining formation properties or image characteristics described previously.

A frequent objection to the concept of instrument bits is that the drilling community prefers the option of selecting its drilling bits on the rig site in "real time." However, for the drilling systems like SLICKBORE® and GEO-PILOT®, where specialized bits are an integral part of the drilling system, this flexibility has been reduced in that the user must abide by the bit options of the company providing the system. Or, possibly the user must be content to choose among a more limited set of (long gauge) bits compatible with the drilling system.

The instrumented bits can be designed as a "transparent" part of these systems, or alternatively, as an optional part of these systems (at least as far as mechanical considerations are concerned). According to the present invention, implementation may-be done as follows: The long gauge portion of the bit consists of an inner core of material, usually steel, the outer surface of which consists of flutes and channels. The flutes remain in contact, or nearly so, with the formation; the channels provide a path beyond the long gauge to the annulus above the bit for the mud flow and drill cuttings. The number of flutes and channels varies with the bit design; however, this is not necessarily a critical parameter limiting the design of the instrumented bit.

The long gauge portion of an 8½ inch *bit*, for *example*, has an inner bore of approximately 2 inches in diameter. It is established practice to bore out a drill collar to nearly six inches diameter to accommodate an insert filling this volume. This can be done in the long gauge portion of a bit also, thereby accommodating an insert of appropriate dimensions. The insert would house the electronics and sensors, or else the electronics which would support sensors which would be located in the drilling bit. It is possible, according to the present invention, to specify that a standard insert can be manufactured, or a limited set of standard inserts, along with an interface to sensors mounted external to the insert but inside or congruent with the surface of the flutes of the drilling bit; that individual bit designs, which vary according to arrangement of cutting surfaces and flute designs, can be manufactured routinely around this insert design.

The long gauge portions of all bits can be manufactured to accommodate a standard insert design. The insert can be retrieved from used bits and inserted in new bits of the same type. Some sensors (instruments) will require instrumentation located in the flutes of bits. This applies principally to those instruments which determine formation properties, an important example of which is those which derive information which allow imaging of the formation. For example, a resistively sensor or one or more high frequency ultrasonic sensors may be mounted in the flute of a bit, near the surface of the flute for the purpose of obtaining a signal proportional to the resistive properties of the formation, or the acoustic reflectivity or the acoustic velocity of the formation, respectively. It is contemplated and within the scope of the invention that a cavity for an electronics insert and any corresponding accommodation for a sensor in the flutes of the bit, may be standardized for incorporation in long gauge bits for a relatively small increase in manufacturing cost for the bit. With such a standardization of in-bit sensors, as bits are produced for use in, e.g., GEO-PILOT® or SLICK-BORE®, a specification can be made whether the bit will include sensors or not. Furthermore, at the end of the life of the bit, the sensor and insert can be recovered for use in another bit. Finally, it may be convenient for all bits to be manufactured to accommodate an insert, especially if there are inserts which may not require inputs from sensors located in the flutes of the bit. With standardized inserts and sensors mounted in the flutes of the bit, it will be necessary to provide some kind of alignment, or "keying" design for the insert which will insure proper connection, or make-up of the insert with the sensor, which is likely to be mounted in the flutes separately from the insert. However, such mechanisms are straightforward and well within the skills of one having ordinary skill in mechanical design.

In another embodiment of the present invention, the azimuthal orientation also may be determined elsewhere along the rotating portion of the drilling string, which is rigidly connected to the bit—as long as the point at which this determination is made is not so far away from the bit that torsional bending of the drill string introduces a significant variation in the orientation of the bit relative to the drill string.

In still another embodiment, the orientation of the bit may be determined through the mechanical link between the bit and the rest of the drilling assembly. In yet another embodiment, a magnetic sensing device may determine the instantaneous orientation of the bit relative to the rest of the bottom hole assembly (BHA).

In still another embodiment of the present invention, information from two axially spaced sensors may be used to infer the rate of penetration by using a system clock to infer the depth between samples and combining all samples within a pre-specified depth interval (e.g., 6 inches). Alternatively, rate of penetration estimates may be made by observing the time interval between cessation of drilling (as viewed, e.g., by a rotational sensor) and assigning a fixed interval (e.g., 30 feet or 90 feet) for a stand of pipe. In addition, for those drilling systems where a telemetry downlink is available, the rate of penetration or actual distance penetrated may be telemetered from the surface to the downhole system (however, some lag may be expected between the instantaneous downhole rate of penetration and that measured at the drilling rig floor).

Other techniques for constructing the formation image may be used and are contemplated and within the scope of the present invention. For example, it is also possible to use a depth based image construction, assuming the presence of a depth sensor downhole, or at least a means of determining relative downhole position, or downhole drilling velocity. Rather than determining the image based on a time sample as indicated above, similar techniques may be used to determine an image for given depth increments (e.g., every centimeter, or every inch).

Data for creating images may be stored in an electronic package(s) located in the insert(s) of the long gauge portion of the drill bit; however, it is preferable to transmit this data continuously to the LWD string. There are several reasons: first, there will be greater processing power and storage capability available in the LWD string; the LWD string will have the communications link with the surface allowing transmission of the data enabling its use for geo-steering applications; and preferably the most economic use of the limited space in the in-bit insert is best utilized for other applications and sensors, thus requiring the use of the mass storage capability of the LWD string, rather than placing a great deal of memory storage capabilities in the in-bit sensor itself. A relatively high band-width transmission system is desired from the in-bit sensors to electronics in the LWD string. For example, two systems currently available are: an acoustic "short hop" system, and a low voltage closed current loop system.

Additional electronic processing module(s) and software may be implemented in the LWD string to accommodate the in-bit sensor(s). This module(s) may be located anywhere within the LWD string; however, how the in-bit sensor communicates with the LWD string may place constraints on the its location in the LWD string. For example, if a current loop is used for transmission between the in-bit sensor and the LWD string, it may be convenient for the module to be at the very bottom of the LWD string (toward the bit) in order to avoid extending the loop through the bore of the LWD string itself. One disadvantage to this approach may be that other sensors are normally preferred on the bottom of the LWD string because of the desirability for them to be as close to the bit as possible. However, the presence of the module would only represent a fractional increase of the separation between these sensors and the bit; furthermore one of the primary reasons for their proximity to the bit is the acquisition of geo-steering data, and the use of the imaging sensor, according to the present invention, would provide a substantial improvement in this capability for a small sacrifice in distance of deeper reading sensors from the bit (Note also that this electronics module need not occupy sensor space as it would be in a sonde or insert in the LWD string).

As described hereinabove, the module may acquire, process, store, and transmit the data from the in-bit sensor(s). It is also contemplated and within the scope of the present invention that the same module could function as a portion of another, longer range acoustic sensor for the purpose of imaging formation structures many tens of feet or meters from the well bore. This sensor would likely consist of several modules including a transmitter and one or more receiving arrays, with the arrays separated from the transmitter by as much as the length of the LWD string, or more.

A feature of the present invention is the interchangeability of sensors and electronic inserts that may be useable from one bit to another. Another feature is instrumented drill bits designed for implementation of the latest drilling technologies. Another feature of the present invention is measurement of the azimuthal orientation of the tool during acquisition of the data used to produce an image of the formation surrounding the borehole. This is desirable for the construction of the image. Preferably, magnetic sensors are used in the long gauge portion of the bit. Other sensors which detect the gravitational or magnetic field of the earth may also be employed to infer the instantaneous orientation of the bit as the data is acquired. Another feature of the present invention is the sensed data may consist of a data stream accompanied by azimuthal information. This data stream may be transmitted to the LWD string where it may be further processed to form an image of the formation surrounding the borehole.

Yet another feature is for the sensor to acquire data in time samples which may consist of the average values obtained by the sensor as it rotated during the time sample. For example, a time sample may be five seconds long. During this five second period the bit might rotate 15 times, or three times each second. It may be desirable, using the azimuthal sensors in the bit, to define an image pixel every two degrees, resulting in 180 pixels as the bit rotates. The final data sample would then consist of 180 pixels for the five second sample. But since the bit rotated 15 times during the five seconds, approximately fifteen data points (samples) would have been acquired for each pixel. Software in the bit sensor could compute the average of the fifteen such samples and assign the result to the appropriate pixel. Then the averaged data may be transmitted to the LWD string for future processing and/or transmission to the drilling rig floor. Rotational intervals may also be divided into unequal segments based on the consideration of other variables, such as the standard deviation of the nuclear counting rates as a function of the rotation of the tool, or a measurement of the standoff from the borehole wall as a function of the rotation of the tool.

A technical advantage of the present invention is the production of high resolution formation images proximate to the bottom (end) of the bottom hole assembly (BHA) while drilling the borehole. Another technical advantage is the taking of imaging data proximate to the bit reduces to a minimum the time between the actual cutting of a rock in the borehole and the measurement of one or more properties of the borehole wall, thus enabling nearly immediate response, in terms of changes in drilling practices, to changes in the formation that is being drilled. Another technical advantage is the design of standard inserts for mounting in the long gauge portion of the bit and sensors for mounting in the flutes of the long gauge. A basic insert and sensor template may be specified which may accommodate many of the standard bit designs.

Other features and advantages of the invention will be apparent from the following description of the embodiments, given for the purpose of disclosure and taken in conjunction with the accompanying drawing.

BRIEF DESCRIPTION OF THE DRAWINGS

A more complete understanding of the present disclosure and advantages thereof may be acquired by referring to the following description taken in conjunction with the accompanying drawing, wherein.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Referring now to the drawings, the details of exemplary embodiments of the present invention are schematically illustrated. Like elements in the drawing will be represented by like numbers, and similar elements will be represented by like numbers with a different lower case letter suffix.

Figure 1:
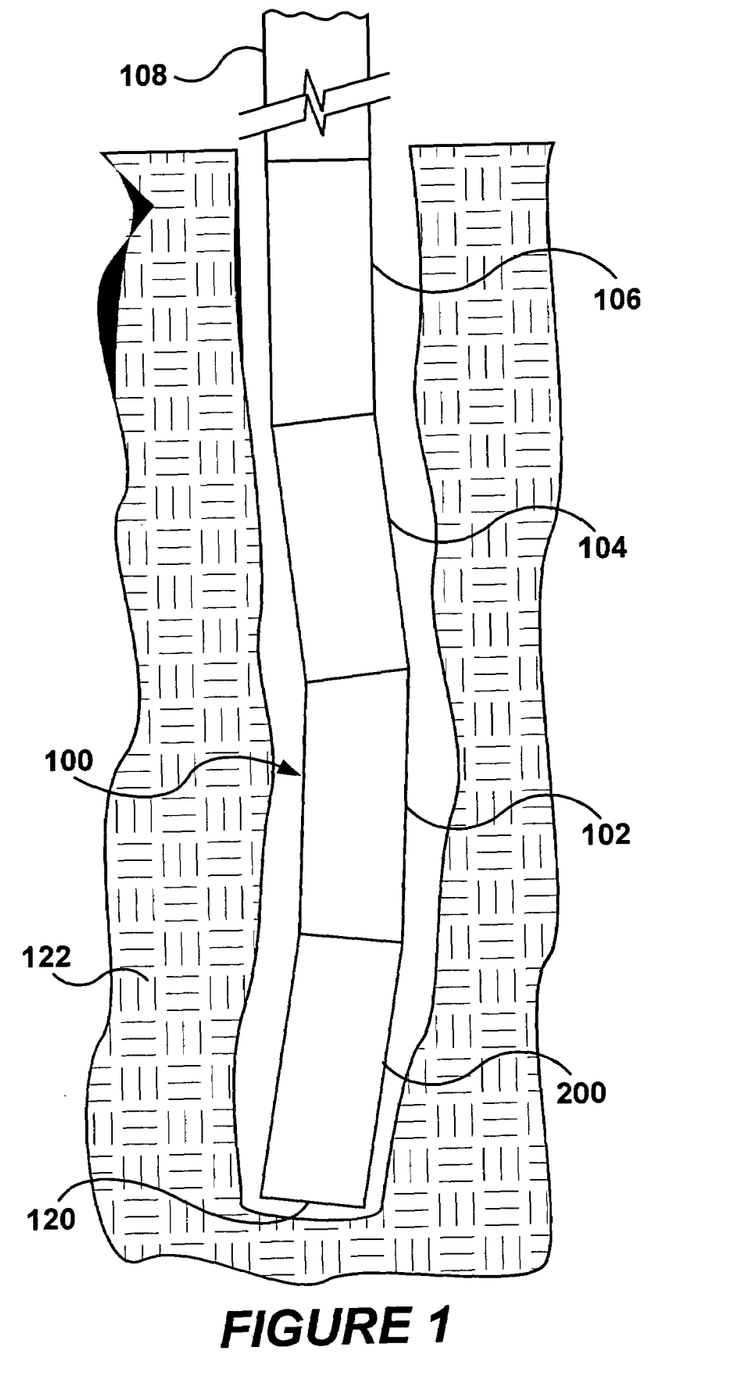
FIG. 1 illustrates a general schematic representation of a bottom hole assembly (BHA)

Referring to FIG. 1, depicted is a bottom hole assembly (BHA). The BHA, generally represented by the numeral 100, is used for drilling a borehole (or wellbore) 120 through underground formations 122. A typical BHA 100 includes a long gauge drill bit 200 for drilling the wellbore 120, a bend section 102, a downhole motor or turbine 104, a logging-while-drilling (LWD) tool 106, and drill string 108 which goes to the surface and connects to a drilling rig (not shown). Other configurations for the BHA 100 are possible and are contemplated to be used with the present invention. For a more detailed description of a steerable drilling system that the present invention may be beneficially used with, see, U.S. Pat. No. 6,269,892 B1, entitled Steerable Drilling System and Method, by Boulton, et al., and U.S. Patent Application Publication No. 2003/0010534 A1, entitled Steerable Drilling System and Method, by Chen, et al., both hereby incorporated by reference herein for all purposes.

Figure 1A:
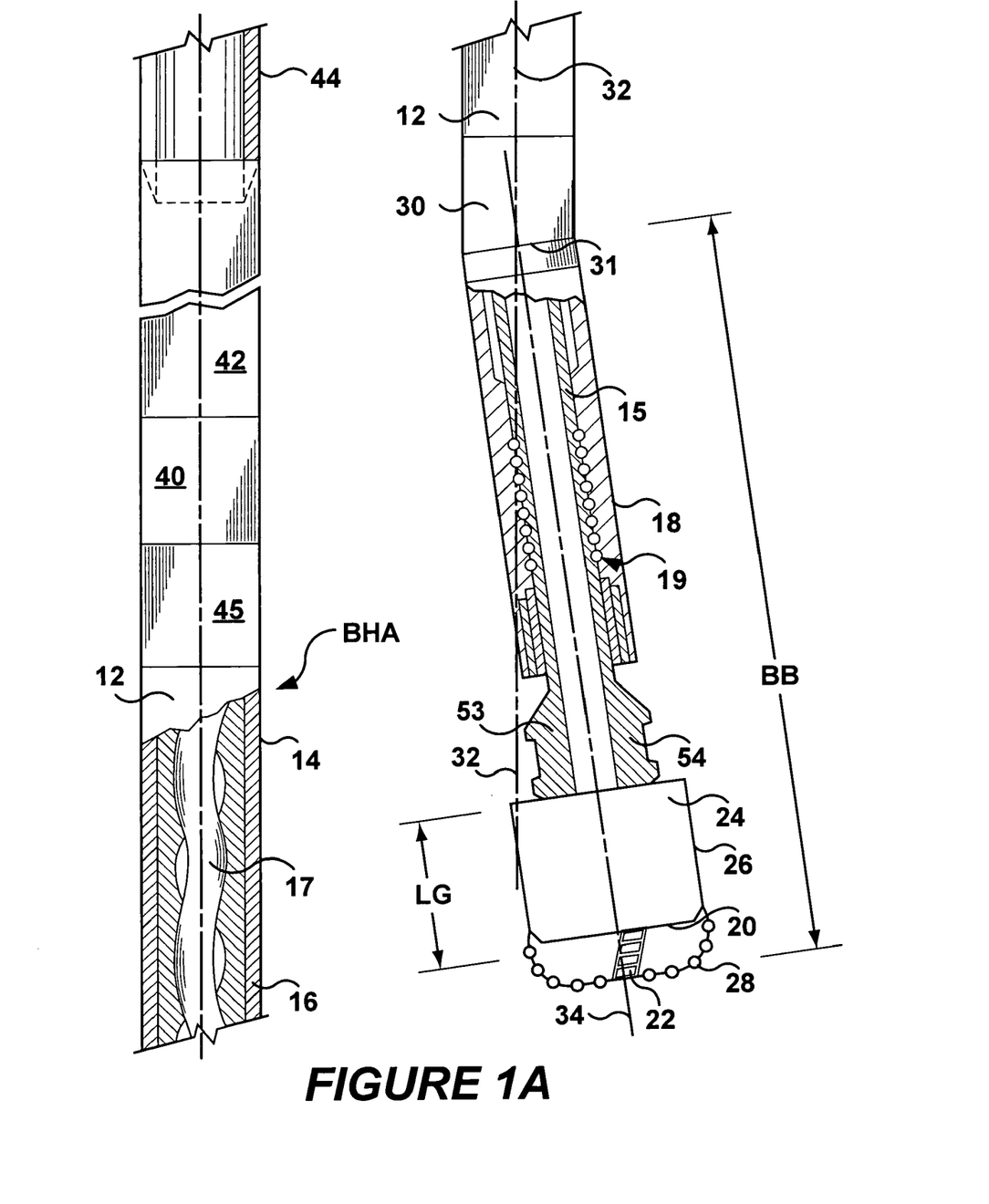
FIG. 1A illustrates a general schematic representation of a bottom hole assembly (BHA) for drilling a deviated borehole.

FIG. 1A depicts a bottom hole assembly (BHA) for drilling a deviated borehole. The BHA consists of a positive displacement motor (PDM) 12 which is conventionally suspended in the well from the threaded tubular string, such as a drill string 44, although alternatively the PDM 12 may be suspended in the well from coiled tubing, as more fully disclosed in commonly owned U.S. Pat. No. 6,269,892 B1. The PDM 12 includes a motor housing 14 having a substantially cylindrical outer surface along at least substantially its entire length. The motor has an upper power section 16 which includes a conventional lobed rotor 17 for rotating the motor output shaft 15 in response to fluid being pumped through the power section 16. Fluid thus flows through the motor stator to rotate the axially curved or lobed rotor 17. A lower bearing housing 18 houses a bearing package assembly 19 which comprises both thrust bearings and radial bearings. Housing 18 is provided below bent housing 30, such that the power section central axis 32 is offset from the lower bearing section central axis 34 by the selected bend angle. This bend angle is exaggerated in FIG. 1A for clarity, and may be less than about 1.25 degree. FIG. 1A also simplistically illustrates the location of an MWD system 40 positioned above the motor 12. The MWD system 40 transmits signals to the surface of the well in real time, as more fully explained in commonly owned U.S. U.S. Pat. No. 6,269,892 B1. The BHA also includes a drill collar assembly 42 providing the desired weight-on-bit (WOB) to the rotary bit. The majority of the drill string 44 comprises lengths of metallic drill pipe, and various downhole tools, such as cross-over subs, stabilizer, jars, etc., and may be included anywhere along the length of the drill string 44.

The term "motor housing" as used herein means the exterior component of the PDM 12 from at least the uppermost end of the power section 16 to the lowermost end of the lower bearing housing 18. As explained subsequently, the motor housing does not include stabilizers thereon, which are components extending radially outward from the otherwise cylindrical outer surface of a motor housing which engage the side walls of the borehole to stabilize the motor. These stabilizers functionally are part of the motor housing, and accordingly the term "motor housing" as used herein would include any radially extending components, such as stabilizers, which extend outward from the otherwise uniform diameter cylindrical outer surface of the motor housing for engagement with the borehole wall to stabilize the motor.

The bent housing 30 thus contains the bend 31 which defines the selected bend angle between the axis 32 and the axis 34. The bent housing 30 may be an adjustable bent housing so that the angle of the bend 31 may be selectively adjusted in the field by the drilling operator. Alternatively, the bent housing 30 could have a bend 31 with a fixed bend angle therein.

The BHA also includes a rotary bit 20 having a bit end face 22. A bit 20 may comprise a long gauge section 24 with a cylindrical outer surface 26 thereon. Fixed PDC cutters 28 are preferably positioned about the bit face 22. The bit face 22 is integral with the long gauge section 24. The axial length (LG) of the gauge section 24 is at least 75% of the bit diameter (BD) as defined by the fullest diameter of the cutting end face 22, and preferably the axial length of gauge section 24 is at least 90% of the bit diameter. In many applications, the bit 20 will have a gauge section 24 wherein the axial length of the gauge section is from one to one and one-half times the bit diameter. The long gauge section 24 of the bit may be ⅟₃₂ inch undersized compared to the bit diameter. The drill bit may be configured to account for the strength, abrasivity, plasticity and drillability of the particular rock being drilled by the deviated hole. Drilling analysis systems as disclosed in U.S. Pat. Nos. 5,704,436, 5,767,399 and 5,794,720 may be utilized so that the bit utilized may be selected for the rock type and drilling parameters intended, these patents are hereby incorporated by reference herein for all purposes.

Figure 1B:
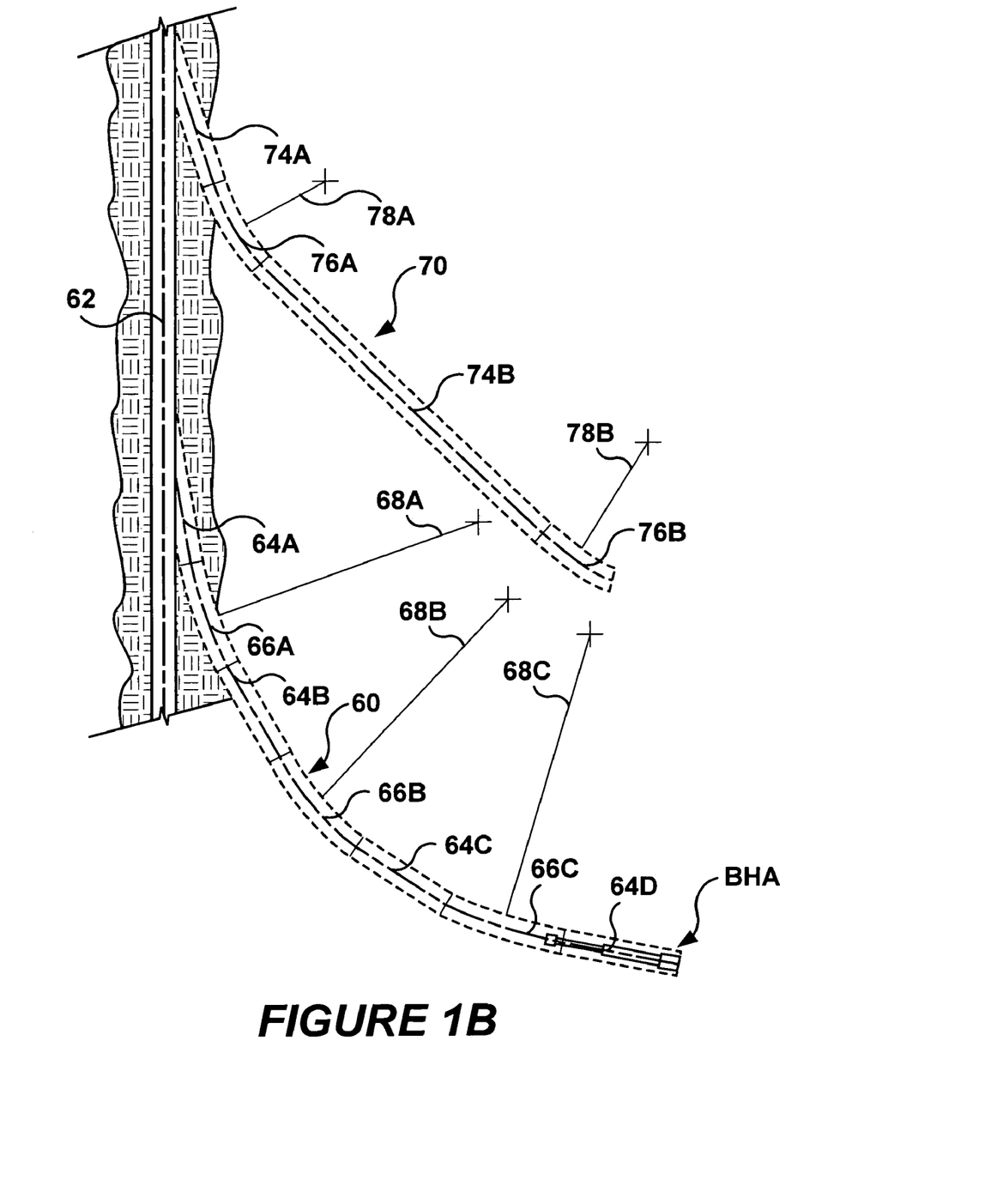
FIG. 1B illustrates the bit trajectory when drilling a deviated borehole, and illustrates in dashed lines the more common trajectory of the drill bit when drilling a deviated borehole according to the prior art methods and systems.

Referring to FIG. 1B, the deviated borehole 60 is drilled from a conventional vertical borehole 62 utilizing the BHA simplistically shown in FIG. 1B. The deviated borehole 60 consists of a plurality of tangent borehole sections 64A, 64B, 64C and 64D, with curved borehole sections 66A, 66B and 66C each spaced between two tangent borehole sections. Each curved borehole section 66 thus has a curved borehole axis formed when sliding the motor during a build mode, while each tangent section 64 has a straight line axis formed when rotating the motor housing. When forming curved sections of the deviated borehole, the motor housing may be slid along the borehole wall during the building operations. The overall trajectory of the deviated borehole 60 thus much more closely approximates a continuous curve trajectory than that commonly formed by conventional BHAs.

FIG. 1B also illustrates in dashed lines the trajectory 70 of a conventional deviated borehole, which may include an initial relatively short straight borehole section 74A, a relatively sharp curved borehole section 76A, a long tangent borehole section 74B with a straight axis, and finally a second relatively sharp curved borehole section 76B. Conventional deviated borehole drilling systems demand a short radius, e.g., 78A, 78B, because drilling in the sliding mode is slow and because hole cleaning in this mode is poor. However, a short radius causes undesirable tortuosity with attendant concerns in later operations. Moreover, a short radius for the curved section of a deviated borehole increases concern for adequate cuttings removal, which is typically a problem while the motor housing is not rotated while drilling. A short bend radius for the curved section of a deviated borehole is tolerated, but conventionally is not desired. The curved sections of the deviated borehole may each have a radius, e.g., 68A, 68B and 68C, which is appreciably larger than the radius of the curved sections of a prior art deviated borehole, and the overall drilled length of these curved sections may be much longer than the curved sections in prior art deviated boreholes. As shown in FIG. 1B, the operation of sliding the motor housing to form a curved section of the deviated borehole and then rotating the motor housing to form a straight tangent section of the borehole may each be performed multiple times, with a rotating motor operation performed between two motor sliding operations.

The desired drilling trajectory may be achieved with a very low bend angle in the motor housing because of the reduced spacing between the bend and the bit face, and because a long curved path rather than a sharp bend and a straight tangent section may be drilled. In many applications wherein the drilling operators may typically use a BHA with a bend of approximately 1.5 degrees, and the trajectory drilled at a faster rate of penetration (ROP) along a continuous curve with BHA bend angle at ¾ degree or less. This reduced bend angle increases the quality of the hole, and significantly reduces the stress on the motor.

Figure 2:
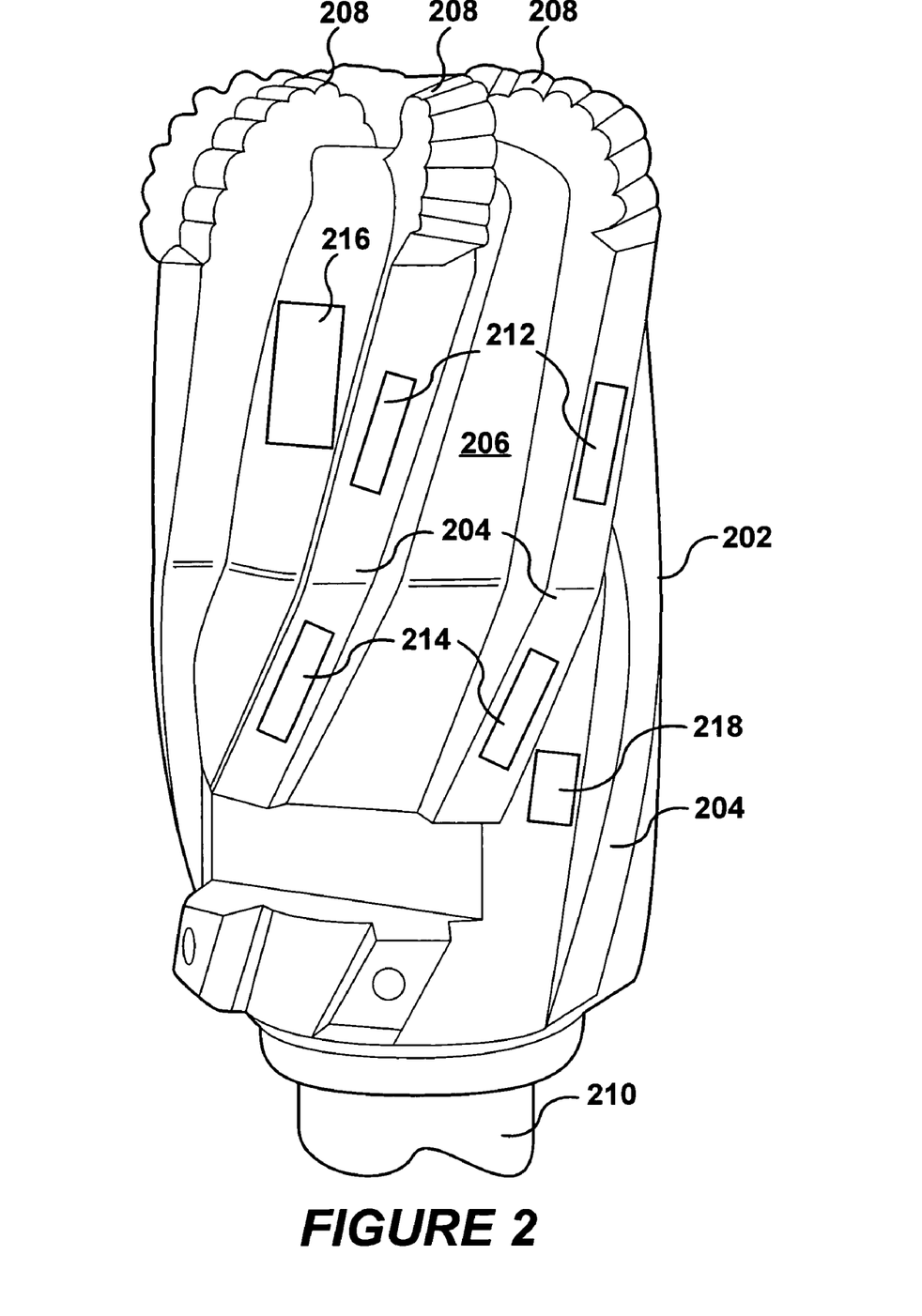
FIG. 2 illustrates a long gauge drill bit having sensors, according to an exemplary embodiment of the present invention.

Referring to FIG. 2, depicted is a long gauge drill bit having sensors, according to an exemplary embodiment of the present invention. The long gauge drill bit 200 comprises a bit face having cutting teeth 208, a long gauge portion 202 of the bit 200; flutes 204 extending from the teeth 208 and over the long gauge portion 202. In the flutes 204 are sensors 212 and 214 and in the long gauge portion 202 are electronic inserts 216 and 218 adapted for electronics packages associated with the sensors 212 and 214. The long gauge drill bit 200 is part of the BHA 100 and is attached thereto with, for example, a coupling 210.

The flutes 204 may be in contact or near contact with the wall of the borehole 120. The sensors 212 and 214 are used to gather information about the formations 122 surrounding the borehole 120. Preferably the long gauge portion 202 of the bit 200 may be sufficiently standardized to accommodate inserts for placement of desired sensors 212 and 214. The sensors 212 and 214 may be for example, but not limited to, highly focused ultrasonic sensors for obtaining acoustic reflective images of the wall of the borehole 120, electrodes for measuring small variations in the resistivity of the formations 122 around the borehole 120, small high frequency antennas sensitive to the local electromagnetic response of the formation or to fields generated as a result of the drilling process, short range highly focused gamma or x-ray scattering sensors, rapid chemical sensors, Micro-Electro-Mechanical Systems (MEMS) and the like. At-bit inclination (ABI) sensors, e.g., triaxial accelerometers, may be used for determining inclination of the long gauge drill bit 200 during drilling operations. All of these types of sensors are well know to those skilled in the art of directional drilling.

It is contemplated and within the scope of the present invention that high resolution measurements may be performed with substantially identical sensors 212 and 214. These sensors 212 and 214 may be spaced apart axially and/or azimuthally by some distance (e.g., six inches) Cross correlation calculations may be used to determine a time interval required for a detected formation 122 to move the distance between the sensors, thereby determining the downhole drilling rate of the BHA 100.

The sensors 212 and 214 may be chosen for their ability to survive in the downhole drilling environment as well as obtain data from which a useful image could be constructed. It is also within the scope of the present invention that multiple sensors 212 and 214 may be placed in a single bit 200 and thereby construction of different, complementary images would be possible. For example, electromagnetic and acoustic sensors probe different aspects of the formation, and therefore different properties would be expressed in the image, often providing additional complementary information.

Data for creating images from the sensors 212 and 214 may be stored in an electronic package(s) located in the inserts 216 and 218, however, it is preferable to transmit this data continuously to the LWD tool 106. There are several reasons for this: first, there will be greater processing power and storage capability available in the LWD tool 106; the LWD tool 106 will have a communications link with the surface drilling rig (not shown) allowing transmission of the data enabling its use for geo-steering applications; and preferably the most economic use of the limited space of the electronic inserts 216 and 218 is best utilized for other applications and sensors, thus the use of the mass storage capability of the LWD tool 106 is preferable rather than placing a great deal of memory storage capabilities in the sensors 212 and 214, and/or electronic package(s) located in the inserts 216 and 218. A relatively high band-width transmission system is preferable from the sensors 212 and 214 and/or electronic package(s) located in the inserts 216 and 218 to the electronic systems in the LWD tool 106. Such systems are available in the industry, e.g., acoustic telemetry as a "short hop" system from an ABI sensor system to a MWD system up the drill string, and a low voltage closed current loop system, both well know to those of skill in the directional drilling industry. Other transmission systems are also contemplated between the measurement components in the long gauge drill bit 200 and the LWD tool 106, and will function for the intended purposes of the present invention. Additional electronic processing module(s) and software may be implemented in the LWD string to accommodate the in-bit sensor(s). This module(s) may be located anywhere within the LWD tool 106.

Figure 3:
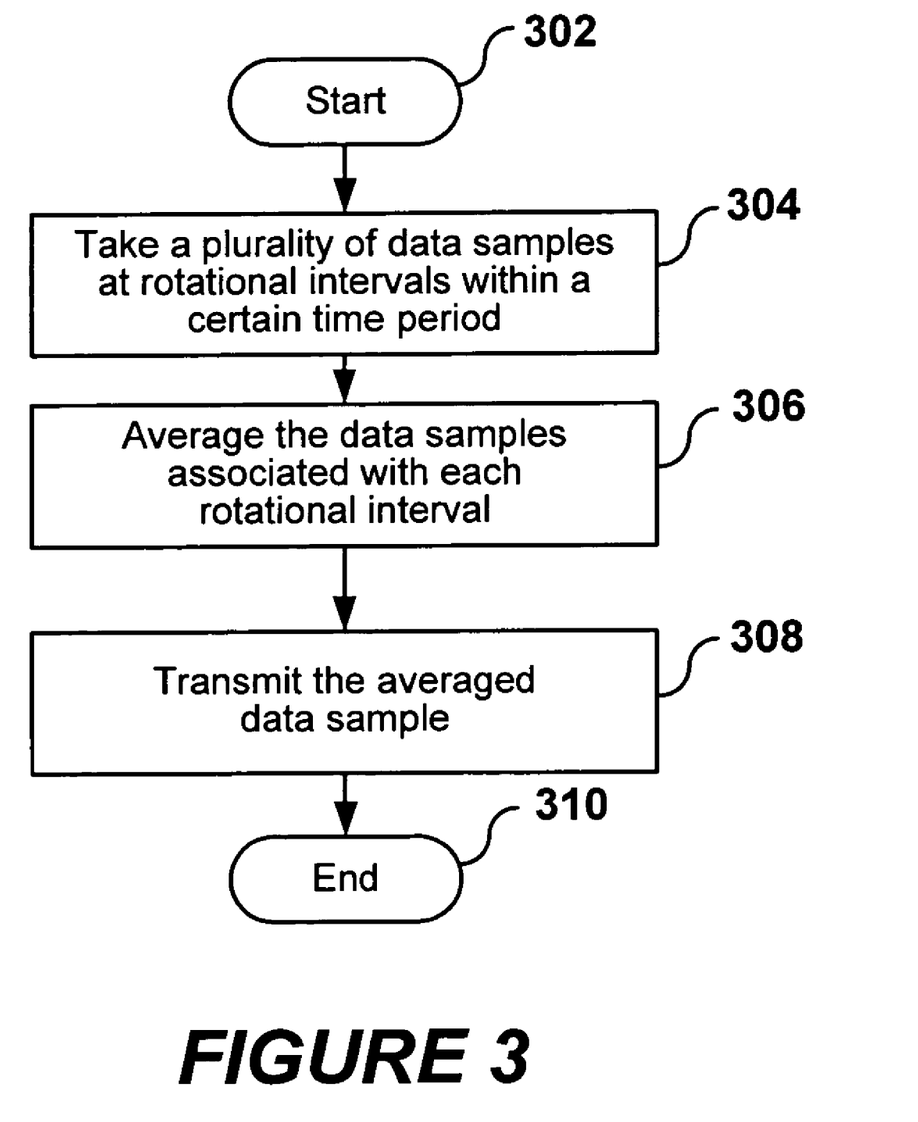
FIG. 3 illustrates a schematic flow diagram of a process for determining images of formations surrounding a borehole.

Referring now to FIG. 3, depicted is a schematic flow diagram of a process for determining images of formations 122 surrounding a borehole 120. The sensors 212 and/or 214 located on the flutes 204 may be used to take a plurality of data samples while the bit 200 rotates. In step 302, the sampling process starts. In step 304, a plurality of data samples may be taken at rotational intervals, for example, 2 degree intervals in a 360 degree rotation within a given period of time. For example, the time period may be five seconds long. During this five second period the bit 200 may rotate 15 times. It may be desirable, using the azimuthal sensors in the bit, to define an image pixel every 2 degrees, for 180 pixels as the bit 200 rotates. The data would then consist of 180 pixels for the five second period sample time. Since the bit 200 rotated 15 times during the five second period sample time, approximately fifteen data points (samples) would have been acquired for each pixel. In step 306, software in the bit sensor 212 or 214 and/or its associated electronics 216 or 218 could compute the average of the fifteen samples for each pixel. Then in step 308, the averaged data may be transmitted to the LWD tool 106 for future processing and/or transmission to the drilling rig floor. In addition, the sensed data may consist of a data stream accompanied by azimuthal information. This data stream may be transmitted to the LWD tool 106 where it may be further processed to form an image of the formation surrounding the borehole.

Figure 4:
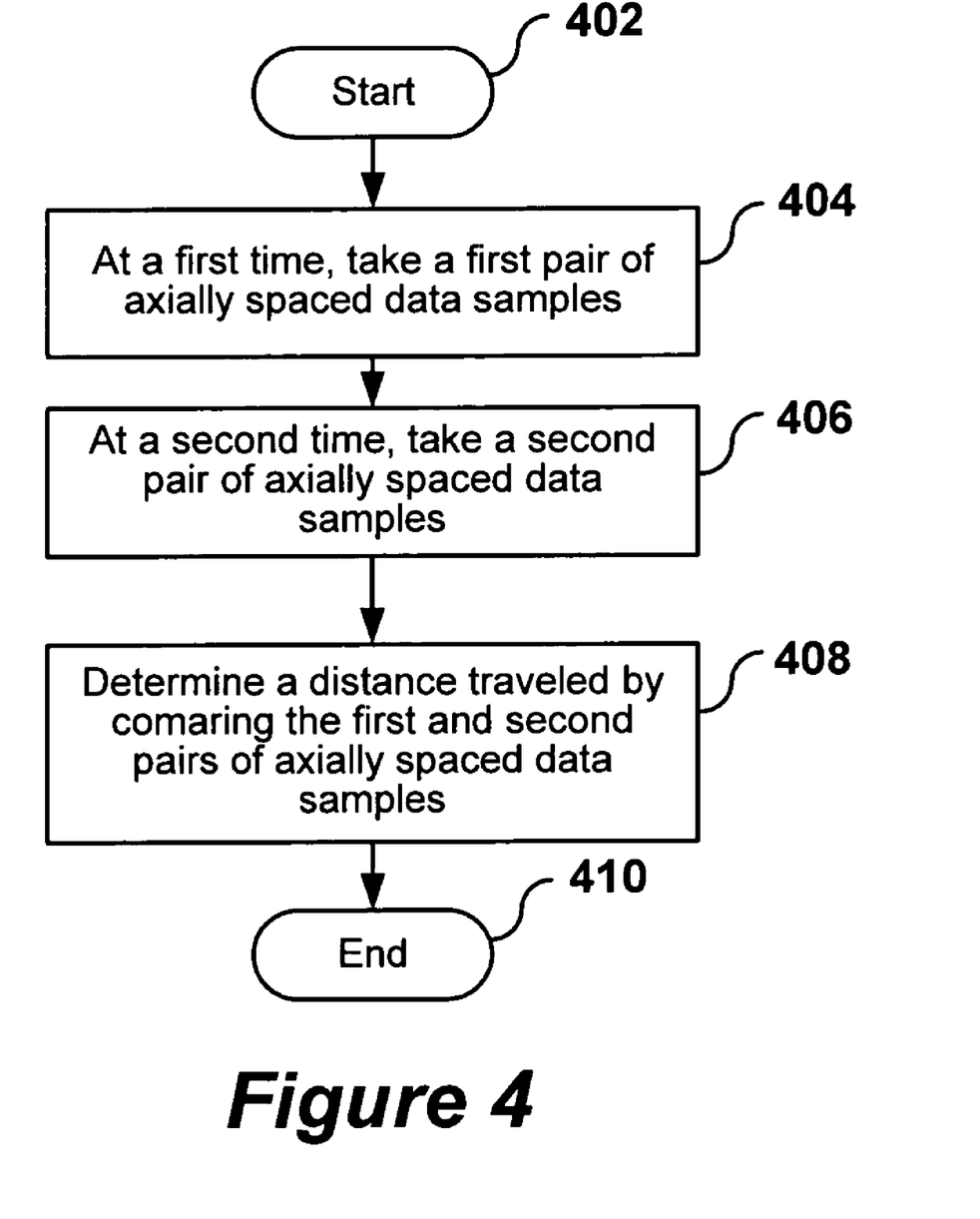
FIG. 4 illustrates a schematic flow diagram of a process for determining rate of penetration of a borehole.

Referring to FIG. 4, depicted is a schematic flow diagram of a process for determining rate of penetration of a borehole. Information from two axially spaced sensors 212 and 214 may be used to infer the rate of penetration by using a system clock to infer the depth between samples and combining all samples within a pre-specified depth interval (e.g., 6 inches). In step 404, a first pair of axially spaced data samples are taken at a first time. In step 406, a second pair of axially spaced data samples are taken at a second time. In step 408, a distance traveled by the bit 200 is determined by comparing the first and second pairs of axially spaced data samples.

Alternatively, rate of penetration estimates may be made by observing the time interval between cessation of drilling (as viewed, e.g., by a rotational sensor) and assigning a fixed interval (e.g., 30 feet or 90 feet) for a stand of pipe. In addition, for those drilling systems where a telemetry downlink is available, the rate of penetration or actual distance penetrated may be telemetered from the surface to the downhole system (however, some lag may be expected between the instantaneous downhole rate of penetration and that measured at the drilling rig floor).

The present invention may be used to obtain an electronic image of the borehole 120 either during drilling, or during the removal of the BHA 100 from the wellbore. The LWD tool 106 may have the capability of determining certain critical parameters such as micro-depth measurements and boundary dip angles on a "real-time" basis by transmitting signals indicative of the desired parameter to the surface via a mud pulse signal or any other real time measurement while drilling (MWD) system.

In accordance with known techniques, wellbore directional measurements can be made as follows: a three axis accelerometer measures the earth's gravitational field vector, relative to the tool axis and a point along the circumference of the tool called the tool face scribe line. From this measurement, the inclination of the BHA 100 can be determined to provide an indication of the deviation of the wellbore with respect to vertical. The three axis accelerometer also provides a measure of "tool face angle," which is the orientation (rotational about the tool axis) angle between the scribe line and the high side of the wellbore. Additionally, a three axis magnetometer measures the earth's magnetic field vector in a similar manner. From the combined magnetometer and accelerometer data, the azimuth and magnetic tool face angle of the LWD tool 106 may be determined. As one skilled in the art will understand, hole azimuth is the direction of the borehole projected onto the horizontal plane relative to North. In many situations, the wellbore is not vertical and the bed boundaries are not horizontal.

The invention, therefore, is well adapted to carry out the objects and attain the ends and advantages mentioned, as well as others inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for creating an image of a formation proximate to a long gauge bit of a bottom hole assembly, said method comprising the steps of:
   disposing at least one sensor on a long gauge bit; and
   taking a plurality of data samples of a formation with the at least one sensor at intervals of a rotation of the long gauge bit within a certain period of time, wherein an image of the formation proximate to the long gauge bit is created from the plurality of data samples; and
   wherein the at least one sensor is disposed in at least one insert in a long gauge portion of the long gauge bit.

2. The method according to claim 1, wherein the at least one sensor is disposed in at least one flute of the long gauge bit.

3. The method according to claim 1, wherein the at least one sensor is disposed on at least one flute of the long gauge bit.

4. The method according to claim 1, wherein the at least one sensor is disposed in the long gauge portion of the long gauge bit.

5. The method according to claim 1, wherein at least two sensors are spaced apart axially.

6. The method according to claim 1, wherein at least two sensors are spaced apart azimuthally.

7. The method according to claim 1, wherein the at least one sensor is an electromagnetic sensor.

8. The method according to claim 1, wherein the at least one sensor is an acoustic sensor.

9. The method according to claim 1, wherein the at least one sensor is a plurality of sensors and some of the plurality of sensors are electromagnetic and some other of the plurality of sensors are acoustic.

10. The method according to claim 1, wherein the rotational intervals are divided into substantially equal segments based on predetermined variables.

11. The method according to claim 1, further comprising the steps of sending the plurality of data samples to a logging-while-drilling (LWD) tool, and receiving control signals from the LWD tool.

12. The method according to claim 1, further comprising the step of transferring each of the plurality of data samples to a logging-while-drilling (LWD) tool.

13. The method according to claim 1, further comprising the step of correlating locations of the long gauge bit with the step of taking the plurality of data samples.

14. The method according to claim 13, wherein the correlated locations of the plurality of data samples are used in determining formation boundaries.

15. The method according to claim 1, wherein the rotational intervals are divided into unequal segments based on predetermined variables.

16. The method according to claim 15, wherein the predetermined variables are selected from the group consisting of standard deviation of nuclear counting rates as a function of rotation of a tool, and measurement of standoff from a borehole wall as a function of rotation of a tool.

17. The method according to claim 1, further comprising the step of determining azimuthal orientations of the long gauge bit during the step of taking the plurality of data samples.

18. The method according to claim 17, wherein the step of determining azimuthal orientations of the long gauge bit is performed with at least one magnetic sensor.

19. The method according to claim 17, wherein the step of determining azimuthal orientations of the long gauge bit is performed with at least one gravitational sensor.

20. A method for measuring rate of penetration into a formation with a long gauge bit of a bottom hole assembly, said method comprising the steps of:
    disposing at least two axially spaced sensors on a long gauge bit;
    taking a first pair of data samples of a formation with the at least two axially spaced sensors at a first time;
    taking a second pair of data samples of the formation with the at least two axially spaced sensors at a second time; and
    determining a distance traveled by the long gauge bit by comparing the first and second pairs of data samples; and
    determining a formation characteristic based, at least in part, on a radial distance traveled by the long gangue bit.

21. The method according to claim 20, further comprising the step of transferring the determined distance traveled by the long gauge bit to a logging-while-drilling system.

22. The method according to claim 20, wherein the at least two axially spaced sensors are selected from the group consisting of nuclear, acoustic and electromagnetic sensors.

23. The method according to claim 20, further comprising the step of determining an orientation of the long gauge bit.

24. The method according to claim 23, wherein the determined orientation is used in creating an azimuthal image of a borehole being drilled.

25. The method according to claim 23, wherein the orientation is determined from sensors selected from the group consisting of gravitational sensors and magnetic sensors.

26. The method according to claim 20, further comprising the step of communicating between the long gauge bit and a logging-while-drilling (LWD) tool.

27. The method according to claim 26, wherein the step of communicating between the long gauge bit and a logging-while-drilling (LWD) tool includes the steps of communicating information, status and control.

28. A bottom hole assembly, comprising:
    a logging-while-drilling tool adapted for coupling to a drill string;
    a rotary motor coupled to the logging-while-drilling tool;
    a bend section coupled to the rotary motor; and
    a long gauge bit, wherein the long gauge bit has at least one sensor therewith; and
    wherein the at least one sensor is disposed in an insert of the long gauge portion of the long gauge bit.

29. The bottom hole assembly according to claim 28, wherein the at least one sensor is an x-ray sensor.

30. The bottom hole assembly according to claim 28, wherein the at least one sensor acquires data of geological formations proximate thereto.

31. The bottom hole assembly according to claim 28, wherein the at least one sensor is disposed in at least one flute of the long gauge bit.

32. The bottom hole assembly according to claim 28, wherein the at least one sensor is disposed in a long gauge portion of the long gauge bit.

33. The bottom hole assembly according to claim 28, wherein at least two sensors are spaced apart axially.

34. The bottom hole assembly according to claim 28, wherein at least two sensors are spaced apart azimuthally.

35. The bottom hole assembly according to claim 28, wherein the at least one sensor is an ultrasonic sensor for obtaining acoustic reflective images of a borehole wall.

36. The bottom hole assembly according to claim 28, wherein the at least one sensor has electrodes for measuring variations in the resistivity of the formation around the borehole.

37. The bottom hole assembly according to claim 28, wherein the at least one sensor is sensitive to electromagnetic response of the formation.

38. The bottom hole assembly according to claim 28, wherein the at least one sensor is a gamma sensor.

39. The bottom hole assembly according to claim 28, wherein the at least one sensor is a chemical sensor.

40. The bottom hole assembly according to claim 28, wherein the at least one sensor is a micro-electro-mechanical sensor.

41. The bottom hole assembly according to claim 28, wherein data from the at least one sensor is transferred to the logging-while-drilling tool.

42. The bottom hole assembly according to claim 41, wherein the data from the at least one sensor is processed in the logging-while-drilling tool.

43. A method for creating an image of a formation proximate to a long gauge bit of a bottom hole assembly, said method comprising the steps of:

disposing at least one sensor on a long gauge bit;

taking a plurality of data samples of a formation with the at least one sensor at intervals of a rotation of the long gauge bit within a certain period of time;

averaging the data samples associated with each rotational interval.

44. The method according to claim 43, further comprising the step of transferring each of the averaged data samples associated with the respective intervals of rotation to a logging-while-drilling (LWD) tool.

* * * * *